(12) United States Patent
Lindqvist

(10) Patent No.: US 7,359,786 B2
(45) Date of Patent: Apr. 15, 2008

(54) CONTROL AND POWER SUPPLY NETWORK FOR VEHICLE BRAKING SYSTEM

(75) Inventor: Anders Lindqvist, Landkrona (SE)

(73) Assignee: Haldex Brake Products AB (SE)

( * ) Notice: Subject to any disclaimer, the term of this patent is extended or adjusted under 35 U.S.C. 154(b) by 211 days.

(21) Appl. No.: 11/128,764

(22) Filed: May 13, 2005

(65) Prior Publication Data

US 2005/0288843 A1  Dec. 29, 2005

Related U.S. Application Data

(63) Continuation-in-part of application No. 10/673,782, filed on Sep. 29, 2003, now Pat. No. 7,150,506, and a continuation-in-part of application No. 10/674,199, filed on Sep. 29, 2003, now Pat. No. 6,984,001.

(60) Provisional application No. 60/570,584, filed on May 13, 2004.

(51) Int. Cl.
*B60T 7/12* (2006.01)
(52) U.S. Cl. .............................. 701/70; 701/80; 701/76; 701/29; 701/31; 701/33; 701/78; 303/20; 303/122; 303/199; 303/155
(58) Field of Classification Search .................. 701/48, 701/70, 71, 76, 81, 82, 83; 303/20, 122, 303/199, 155
See application file for complete search history.

(56) References Cited

U.S. PATENT DOCUMENTS

| 4,653,614 A | 3/1987 | Price et al. ................... 188/70 |
| 4,852,699 A | 8/1989 | Karnopp et al. ............ 188/72.2 |
| 4,946,007 A | 8/1990 | Pederson et al. ......... 188/24.14 |
| 4,974,704 A | 12/1990 | Miller et al. .............. 188/24.24 |
| 5,012,901 A | 5/1991 | Campbell et al. .......... 188/71.4 |
| 5,255,962 A * | 10/1993 | Neuhaus et al. ............. 303/188 |
| 5,752,748 A | 5/1998 | Schramm et al. .............. 303/20 |
| 5,788,023 A | 8/1998 | Schoner et al. ............ 188/72.7 |
| 5,810,454 A | 9/1998 | Prinzler et al. ................ 303/20 |
| 5,829,557 A | 11/1998 | Halasy-Wimmer et al. . 188/162 |

(Continued)

FOREIGN PATENT DOCUMENTS

EP         0832800         1/1998

(Continued)

*Primary Examiner*—Thomas Black
*Assistant Examiner*—Wae Lenny Louie
(74) *Attorney, Agent, or Firm*—St. Onge Steward Johnston & Reens LLC

(57) ABSTRACT

An electrically controlled braking system includes a first control unit and a second control unit in electrical communication via a communication link and a human machine-interface manipulatable by a vehicle operator. The human-machine interface includes a first sensor and a second sensor, the first sensor providing an input signal to the first control unit, and the second sensor providing an input signal to the second control unit. The first control unit and the second control unit compare the input signal received from the first sensor with the input signal received from the second sensor, and generate control signals at least in part based upon the input signal received from the first sensor, the input signal received from the second sensor, and the comparison of the input signal received from the first sensor with the input signal received from the second sensor.

29 Claims, 4 Drawing Sheets

U.S. PATENT DOCUMENTS

| | | | |
|---|---|---|---|
| 5,961,190 A * | 10/1999 | Brandmeier et al. | 303/152 |
| 5,975,250 A | 11/1999 | Brandmeier et al. | 188/1.11 |
| 6,157,887 A | 12/2000 | Zittlau | 303/122.03 |
| 6,189,981 B1 * | 2/2001 | Niedermeier | 303/20 |
| 6,209,966 B1 * | 4/2001 | Mies | 303/3 |
| 6,213,567 B1 | 4/2001 | Zittlau et al. | 303/20 |
| 6,231,133 B1 | 5/2001 | Tsukamoto | 303/122.04 |
| 6,256,570 B1 * | 7/2001 | Weiberle et al. | 701/70 |
| 6,296,325 B1 * | 10/2001 | Corio et al. | 303/20 |
| 6,318,513 B1 | 11/2001 | Dietrich et al. | 188/72.7 |
| 6,349,996 B1 * | 2/2002 | Heckmann et al. | 303/122.04 |
| 6,354,671 B1 | 3/2002 | Feldmann et al. | 303/15 |
| 6,410,993 B1 * | 6/2002 | Giers | 307/10.1 |
| 6,412,880 B1 * | 7/2002 | Knechtges et al. | 303/20 |
| 6,525,432 B2 | 2/2003 | Heckmann et al. | 307/10 |
| 6,540,309 B1 | 4/2003 | Jordan et al. | 303/122.07 |
| 6,684,146 B1 * | 1/2004 | Hedenetz | 701/70 |
| 6,709,069 B2 * | 3/2004 | Riddiford et al. | 303/20 |
| 6,749,269 B1 * | 6/2004 | Niwa | 303/20 |
| 6,984,001 B2 * | 1/2006 | Nilsson | 303/20 |
| 7,096,108 B2 * | 8/2006 | Nilsson et al. | 701/70 |
| 7,150,506 B2 * | 12/2006 | Nilsson et al. | 303/20 |
| 2005/0067888 A1 | 3/2005 | Nilsson | 303/20 |

FOREIGN PATENT DOCUMENTS

| | | |
|---|---|---|
| EP | WO 01/57647 | 8/2001 |
| EP | 1231121 | 8/2002 |
| WO | WO 03071150 | 8/2003 |

\* cited by examiner

CONTROL AND POWER SUPPLY NETWORK FOR VEHICLE BRAKING SYSTEM

RELATED APPLICATIONS

This patent application is a continuation-in-part of U.S. patent application Ser. No. 10/673,782 filed Sep. 29, 2003, now U.S. Pat. No. 7,150,506 is a continuation-in-part of currently U.S. patent application Ser. No. 10/674,199 filed Sep. 29, 2003, now U.S. Pat. No. 6,984,001 and claims the benefit of, under Title 35, United States Code, Section 119(e), U.S. Provisional Patent Application No. 60/570,584, filed May 13, 2004.

FIELD OF THE INVENTION

The present invention relates generally to an electrically controlled and/or electrically actuated braking system which is intended for use with wheeled vehicles, and more particularly to a control and power supply network for such a braking system which incorporates enhanced safety features.

BACKGROUND OF THE INVENTION

Traditional braking systems for motor vehicles include conventional hydraulic or pneumatic brakes associated with two or more wheels of the vehicle. Such conventional brakes are actuated by pressurized fluid or compressed air. When actuated, the brakes exert a force on a disk or drum which spins in conjunction with the wheel of the vehicle in order to create frictional forces which resist rotation of the wheel. Traditionally, control signals have been transmitted to each of the brake system's actuators mechanically, or by a hydraulic or pneumatic control circuit. However, it has more recently been proposed to employ a centralized control unit to generate electronic control signals and to use such electronic control signals to control actuation of a vehicle's brakes. This type of electronic control scheme has become even more prevalent in view of modern brake systems which now often include not only conventional hydraulic or pneumatic brake actuator functionality, but also supplemental electronic functions such as antilock protection (ABS), electronic dynamic stability control (ESP) and/or electronic braking force distribution (EBV) between the front and rear axles, as well as blending of brake effort distribution between the conventional service brakes and auxiliary brakes, such as retarders and engine brakes.

U.S. Pat. No. 6,354,671 discloses a brake system in which electronic signals are used to at least partially control actuation of a vehicle's brakes. However, as recognized in the patent, brake system failure due to failure of the electronic control unit (for example, due to a failure in the electrical power supply) is a significant risk. As such, system redundancy is provided in the form of a back-up pneumatic control circuit. Should the electronic control unit malfunction due to failure of the electrical power supply or for some other reason, the braking system is controlled by the back-up pneumatic control circuit in much the same way as traditional brake systems operate. However, such a system suffers from a number of disadvantages. Providing a back-up pneumatic control circuit greatly complicates the braking system and increases the costs thereof. Moreover, when operating in the back-up mode, the advanced functionality of the electronic control system is lost. As such, providing a pneumatic back-up system defeats many of the advantages of providing an electronic control circuit in the first place.

U.S. Pat. No. 6,209,966 obviates some of the problems associated with providing a back-up pneumatic control circuit by employing two electronic control units, which operate independently of each other, and which provide control signals to a brake cylinder assigned to a wheel and a braking pressure modulator valve which is fluid-connected to the brake cylinder. The braking pressure modulator has a first electric actuating element, which can be activated by a first of the two control units, and a second electric actuating element which acts in the same direction when activated as the first electric actuating element. The second electric actuating element can be activated by the second electronic control unit at the same time as the first electric actuating element is being activated by the first electronic control unit. Thus, system redundancy is provided by providing two separate electronic control units, each of which controls one of two separate electric actuating elements associated with each wheel.

While U.S. Pat. No. 6,209,966 obviates some of the problems associated with providing a back-up pneumatic control circuit, it suffers from disadvantages of its own. The braking system disclosed in the '966 patent would require two separate electronic actuating elements associated with each wheel. This requirement, however, needlessly complicates and increases the cost of the system. This is true because control problems, when they arise, are generally caused by a malfunction in the control unit, the control network by which control signals are transmitted to the actuating elements and/or the power supply network or networks, not by failure of the actuating elements themselves. As such, providing two actuating elements for each wheel would not significantly enhance safety of the braking system. Moreover, because both electronic control networks (i.e., the control networks associated with each electronic control unit) and presumably the electrical power supply network or networks are directly connected to actuating elements at each wheel, it is possible for an external catastrophic event, such as a tire explosion, in the vicinity of one of the wheels to cut the control and power supply network cabling and/or cause a short-circuit in both control networks as well as the power supply network or networks, thereby causing the entire brake system to fail.

It has been suggested to create a redundant electronic control system where two separate control networks are employed. Such a system 100, shown in FIG. 1, employs one or more central control units 102 provided to control two or more brake assemblies 104, 106, 108, 110, 112, 114, each having a brake actuator 116 incorporating an electronic control unit 118. Central control unit or units 102 is or are in electrical communication with the electronic control unit 118 of each of brake assemblies 104, 106, 108, 110, 112, 114 via at least two electronic control networks 120, 122. As seen in FIG. 1, all of electronic control units 118 of all brake assemblies 104, 106, 108, 110, 112, 114 are connected to each electronic control network 120, 122. By providing such an arrangement, should one electronic control network fail, the other electronic control network would theoretically maintain control of all brake assemblies.

However, this arrangement suffers from disadvantages similar to those suffered by U.S. Pat. No. 6,209,966 discussed above. More specifically, because both electronic control networks 120, 122 are directly electrically connected to electronic control units 118 of all brake assemblies 104, 106, 108, 110, 112, 114, it is possible for an external catastrophic event, such as a tire explosion, in the vicinity of one of the brake assemblies to cut the network cabling and/or cause a short-circuit in both control networks 120, 122, thereby causing the entire brake system to fail.

It has also been suggested to create a redundant power supply system where two separate power supply networks are employed. Such a system 200, shown in FIG. 2, employs one or more power supplies 202 provided to supply power to two or more brake assemblies 204, 206, 208, 210, 212, 214, each having a brake actuator 216 incorporating an electronic control unit 218. Power supply or supplies 202 is or are in electrical communication with the electronic control unit 218 of each of brake assemblies 204, 206, 208, 210, 212, 214 via at least two power supply networks 220, 222. As seen in FIG. 2, all of electronic control units 218 of all brake assemblies 204, 206, 208, 210, 212, 214 are connected to each power supply network 220, 222. By providing such an arrangement, should one power supply network fail, the other power supply network would theoretically supply power to all brake assemblies.

However, this arrangement also suffers from disadvantages similar to those suffered by U.S. Pat. No. 6,209,966 discussed above. More specifically, because both power supply networks 220, 222 are directly electrically connected to electronic control units 218 of all brake assemblies 204, 206, 208, 210, 212, 214, it is possible for an external catastrophic event, such as a tire explosion, in the vicinity of one of the brake assemblies to cut the network cabling and/or cause a short-circuit in both power supply networks 220, 222, thereby causing the entire brake system to fail.

A further disadvantage of all known systems is that none take into account the possibility of errors occurring between an input device actuated by a user and the control unit(s), which typically converts the input signals received from an input device into brake control signals to be used by the brake actuators to control the brakes. Rather, known prior art systems which do provide some type of "error checking" check only for transmission errors within the communications networks between the control unit(s) and the brake actuators. There is no provision for the checking of errors between input devices and the control unit(s).

What is desired, therefore, is an electrically controlled braking system which is intended for use with wheeled vehicles, which incorporates enhanced safety features, which employs system redundancy in case of partial system failure, which is relatively uncomplicated and less costly as compared to known systems, which is not prone to complete system failure in the case of an external catastrophic event, and which provides for the checking of errors between input devices and the control unit(s) which control actuation of the brakes.

SUMMARY OF THE INVENTION

Accordingly, it is an object of the present invention to provide an electrically controlled braking system which is intended for use with wheeled vehicles.

Another object of the present invention is to provide an electrically controlled braking system having the above characteristics and which incorporates enhanced safety features.

A further object of the present invention is to provide an electrically controlled braking system having the above characteristics and which employs system redundancy in case of partial system failure.

Still another object of the present invention is to provide an electrically controlled braking system having the above characteristics and which is relatively uncomplicated and less costly as compared to known systems.

Yet a further object of the present invention is to provide an electrically controlled braking system having the above characteristics and which is not prone to complete system failure in the case of an external catastrophic event.

Still a further object of the present invention is to provide an electrically controlled braking system having the above characteristics and which provides for the checking of errors between input devices and the control unit(s) which control actuation of the brakes.

These and other objects of the present invention are achieved according to one embodiment by provision of an electrically controlled braking system which includes a first control unit and a second control unit in electrical communication via a communication link and a human machine-interface manipulatable by a vehicle operator. The human-machine interface includes a first sensor and a second sensor, the first sensor providing an input signal to the first control unit, and the second sensor providing an input signal to the second control unit. The first control unit and the second control unit compare the input signal received from the first sensor with the input signal received from the second sensor, and generate control signals at least in part based upon the input signal received from the first sensor, the input signal received from the second sensor, and the comparison of the input signal received from the first sensor with the input signal received from the second sensor.

In some embodiments, the first control unit and the second control unit further determine whether the input signal received from the first sensor and the input signal received from the second sensor are valid. In certain of these embodiments, the determination as to whether the input signal received from the first sensor and the input signal received from the second sensor are valid is based at least in part upon a determination as to whether the input signal received from the first sensor and the input signal received from the second sensor have values falling within an expected range. In certain embodiments, the system further includes an error condition indicator, and the error condition indicator is activated if at least one of the input signal received from the first sensor and the input signal received from the second sensor is invalid. In certain embodiments, the first control unit and the second control unit generate control signals indicative of a demand for parking brake application if both of the input signal received from the first sensor and the input signal received from the second sensor are invalid.

In some embodiments, the comparison of the input signal received from the first sensor with the input signal received from the second sensor is based at least in part upon a determination of whether a value of the input signal received from the first sensor differs from a value of the input signal received from the second sensor by more than an acceptable variance. In certain of these embodiments, the comparison of the input signal received from the first sensor with the input signal received from the second sensor is further based at least in part upon a determination of whether a value of the input signal received from the second sensor differs from a value of the input signal received from the first sensor by more than an acceptable variance. In some embodiments, the human machine-interface comprises at least one of a pedal, a switch, a joystick, a lever, a button and a knob.

In some embodiments, the system further includes a first brake component responsive to the control signals generated by the first control unit and the second control unit, a second brake component responsive to the control signals generated by the first control unit and the second control unit, a first control network electrically connecting the first control unit and the first brake component, the first control network adapted to transmit the control signals from the first control unit to the first brake component, and a second control network electrically connecting the second control unit and the second brake component, the second control network adapted to transmit the control signals from the second control unit to the second brake component. In certain of these embodiments, the system further includes an auxiliary control link electrically connecting the first brake component and the second brake component, the auxiliary control link adapted to transmit the control signals between the first brake component and the second brake component when a failure occurs in one of the first control network or the second control network.

In some embodiments, the system further includes at least one power supply, the at least one power supply supplying electrical power, a first brake component responsive to the control signals generated by the first control unit and the second control unit and at least partially operated by electrical power, a second brake component responsive to the control signals generated by the first control unit and the second control unit and at least partially operated by electrical power, a first power supply network electrically connecting the at least one power supply and the first brake component, the first power supply network adapted to transmit the electrical power from the at least one power supply to the first brake component, and a second power supply network electrically connecting the at least one power supply and the second brake component, the second power supply network adapted to transmit the electrical power from the at least one power supply to the second brake component. In certain embodiments, the system further includes an auxiliary power supply link activatable to electrically connect the first brake component and the second brake component when a failure occurs in one of the first power supply network or the second power supply network, the auxiliary power supply link adapted to transmit the electrical power between the first brake component and the second brake component when the failure occurs.

In accordance with another embodiment of the present invention, an electrically controlled braking system includes at least one control unit, the at least one control unit generating control signals, at least one power supply, the at least one power supply supplying electrical power, a first brake component responsive to the control signals generated by the at least one control unit and at least partially operated by electrical power, a second brake component responsive to the control signals generated by the at least one control unit and at least partially operated by electrical power, a first control network electrically connecting the at least one control unit and the first brake component, the first control network adapted to transmit the control signals from the at least one control unit to the first brake component, a second control network electrically connecting the at least one control unit and the second brake component, the second control network adapted to transmit the control signals from the at least one control unit to the second brake component, an auxiliary control link electrically connecting the first brake component and the second brake component, the auxiliary control link adapted to transmit the control signals between the first brake component and the second brake component when a failure occurs in one of the first control network or the second control network, a first power supply network electrically connecting the at least one power supply and the first brake component, the first power supply network adapted to transmit the electrical power from the at least one power supply to the first brake component, a second power supply network electrically connecting the at least one power supply and the second brake component, the second power supply network adapted to transmit the electrical power from the at least one power supply to the second brake component, and an auxiliary power supply link activatable to electrically connect the first brake component and the second brake component when a failure occurs in one of the first power supply network or the second power supply network, the auxiliary power supply link adapted to transmit the electrical power between the first brake component and the second brake component when the failure occurs.

In some embodiments, the at least one control unit comprises a first control unit and a second control unit, the first control unit and the second control unit being in electrical communication via a communication link, the system further includes a human machine-interface manipulatable by a vehicle operator, the human-machine interface comprising a first sensor and a second sensor, the first sensor providing an input signal to the first control unit, and the second sensor providing an input signal to the second control unit, and the first control unit and the second control unit compare the input signal received from the first sensor with the input signal received from the second sensor, and generate control signals at least in part based upon the input signal received from the first sensor, the input signal received from the second sensor, and the comparison of the input signal received from the first sensor with the input signal received from the second sensor.

In certain of these embodiments, the first control unit and the second control unit further determine whether the input signal received from the first sensor and the input signal received from the second sensor are valid. In certain of these embodiments, the determination as to whether the input signal received from the first sensor and the input signal received from the second sensor are valid is based at least in part upon a determination as to whether the input signal received from the first sensor and the input signal received from the second sensor have values falling within an expected range. In certain embodiments, the system further includes an error condition indicator, and the error condition indicator is activated if at least one of the input signal received from the first sensor and the input signal received from the second sensor is invalid. In certain embodiments, the first control unit and the second control unit generate control signals indicative of a demand for parking brake application if both of the input signal received from the first sensor and the input signal received from the second sensor are invalid.

In some embodiments, the comparison of the input signal received from the first sensor with the input signal received from the second sensor is based at least in part upon a determination of whether a value of the input signal received from the first sensor differs from a value of the input signal received from the second sensor by more than an acceptable variance. In certain of these embodiments, the comparison of the input signal received from the first sensor with the input signal received from the second sensor is further based at least in part upon a determination of whether a value of the input signal received from the second sensor differs from a value of the input signal received from the first sensor by more than an acceptable variance. In some embodiments, the human machine-interface comprises at least one of a pedal, a switch, a joystick, a lever, a button and a knob.

In accordance with another aspect of the present invention, a method of controlling a braking system includes the steps of: providing a first control unit and a second control unit in electrical communication with one another via a communication link; manipulating a human machine-interface having a first sensor and a second sensor; providing an input signal from the first sensor to the first control unit; providing an input signal from the second sensor to the second control unit; comparing the input signal received from the first sensor with the input signal received from the second sensor; and generating control signals at least in part based upon the input signal received from the first sensor, the input signal received from the second sensor, and the comparison of the input signal received from the first sensor with the input signal received from the second sensor.

In some embodiments, the method further includes the step of determining whether the input signal received from the first sensor and the input signal received from the second sensor are valid. In certain of these embodiments, the step of determining whether the input signal received from the first sensor and the input signal received from the second sensor are valid is based at least in part upon a determination as to whether the input signal received from the first sensor and the input signal received from the second sensor have values falling within an expected range. In certain embodiments, the method further includes the step of activating an error condition indicator if at least one of the input signal received from the first sensor and the input signal received from the second sensor is invalid. In certain of these embodiments, the method further includes the step of generating control signals indicative of a demand for parking brake application if both of the input signal received from the first sensor and the input signal received from the second sensor are invalid.

In some embodiments, the step of comparing the input signal received from the first sensor with the input signal received from the second sensor is based at least in part upon a determination of whether a value of the input signal received from the first sensor differs from a value of the input signal received from the second sensor by more than an acceptable variance. In certain of these embodiments, the step of comparing the input signal received from the first sensor with the input signal received from the second sensor is further based at least in part upon a determination of whether a value of the input signal received from the second sensor differs from a value of the input signal received from the first sensor by more than an acceptable variance. In certain embodiments, the human machine-interface comprises at least one of a pedal, a switch, a joystick, a lever, a button and a knob.

In some embodiments, the method further includes the steps of: providing a first brake component responsive to the control signals generated by the first control unit and the second control unit; providing a second brake component responsive to the control signals generated by the first control unit and the second control unit; electrically connecting the first control unit and the first brake component via a first control network, the first control network adapted to transmit the control signals from the first control unit to the first brake component; and electrically connecting the second control unit and the second brake component via a second control network, the second control network adapted to transmit the control signals from the second control unit to the second brake component. In certain of these embodiments, the method further includes the step of electrically connecting the first brake component and the second brake component via an auxiliary control link, the auxiliary control link adapted to transmit the control signals between the first brake component and the second brake component when a failure occurs in one of the first control network or the second control network.

In some embodiments, the method further includes the steps of: supplying electrical power with at least one power supply; providing a first brake component responsive to the control signals generated by the first control unit and the second control unit and at least partially operated by electrical power; providing a second brake component responsive to the control signals generated by the first control unit and the second control unit and at least partially operated by electrical power; electrically connecting the at least one power supply and the first brake component via a first power supply network, the first power supply network adapted to transmit the electrical power from the at least one power supply to the first brake component; and electrically connecting the at least one power supply and the second brake component via a second power supply network, the second power supply network adapted to transmit the electrical power from the at least one power supply to the second brake component. In certain of these embodiments, the method further includes the step of activating an auxiliary power supply link to electrically connect the first brake component and the second brake component when a failure occurs in one of the first power supply network or the second power supply network, the auxiliary power supply link adapted to transmit the electrical power between the first brake component and the second brake component when the failure occurs.

The invention and its particular features and advantages will become more apparent from the following detailed description considered with reference to the accompanying drawings.

DETAILED DESCRIPTION OF EXEMPLARY EMBODIMENTS OF THE INVENTION

Figure 1:
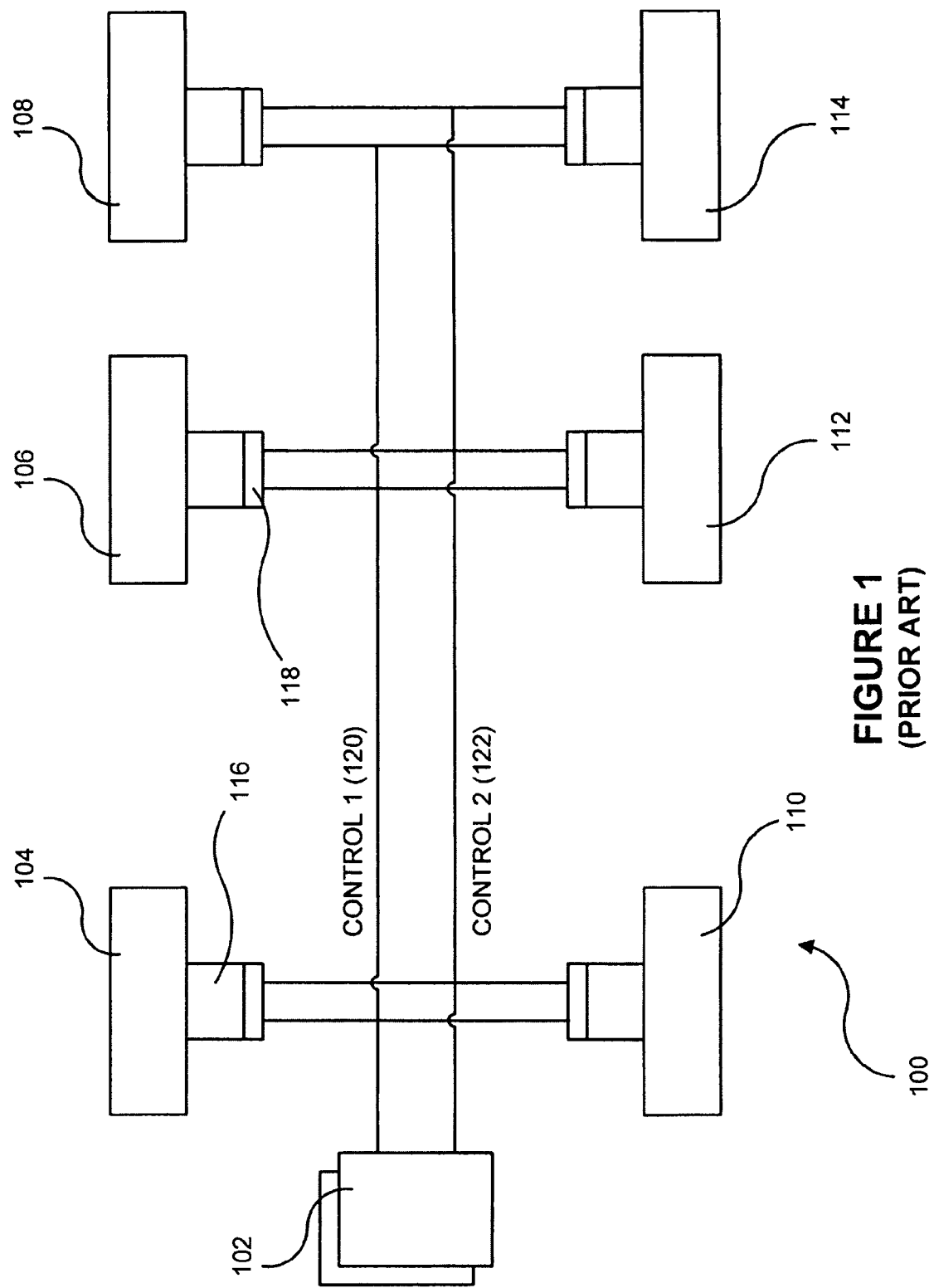
FIG. 1 is a schematic view of an electrically controlled braking system which incorporates redundant control networks in accordance with a known prior art design.
Figure 2:
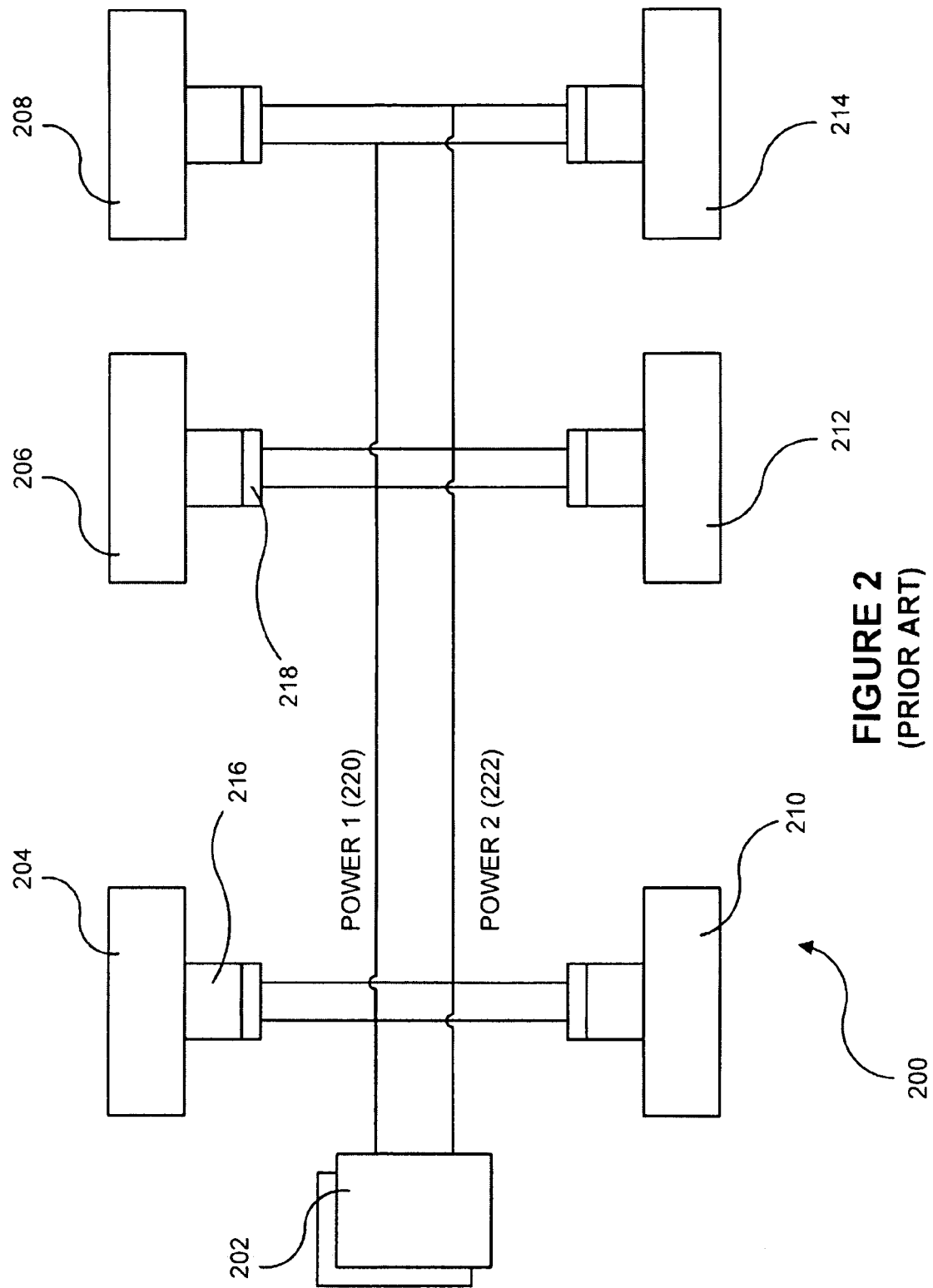
FIG. 2 is a schematic view of an electrically controlled braking system which incorporates redundant power supply networks in accordance with a known prior art design.
Figure 3:
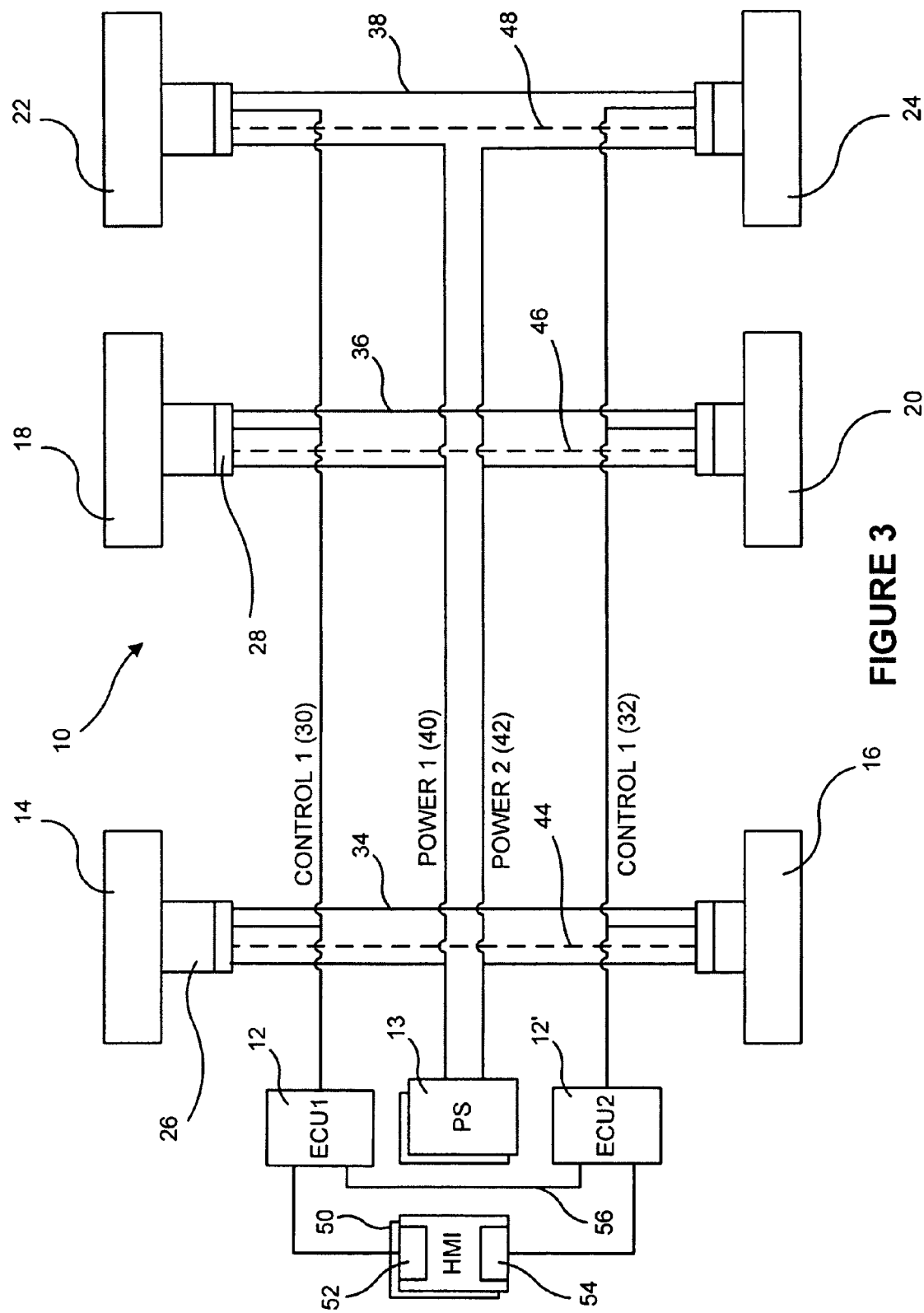
FIG. 3 is a schematic view of an electrically controlled braking system which incorporates redundant control networks and redundant power supply networks, along with error checking, in accordance with the present invention; and, FIG. 4 is a flow chart illustrating an example of an error checking routine employed by the electrically controlled braking system of FIG. 3.

Referring to FIG. 3, electrically controlled and/or actuated braking system 10 in accordance with the present invention is shown. Braking system 10 includes at least two control units 12, 12' which generate control signals, and at least one power supply 13 which generates and/or stores electrical power. Braking system 10 also includes a plurality of brake components 14, 16, 18, 20, 22, 24. While six brake components 14, 16, 18, 20, 22, 24 are shown in FIG. 3, it should be understood that braking system 10 may include a greater or lesser number of brake components. It is desirable, although not strictly necessary, that an even number of brake components are provided, and that the brake components are treated as pairs. For example, the brake components associated with the pair of wheels on each axle may be treated as a pair. In FIG. 3, first brake component 14 is paired with second brake component 16, third brake component 18 is paired with fourth brake component 20, and fifth brake component 22 is paired with sixth brake component 24.

Each of brake components 14, 16, 18, 20, 22, 24 is responsive to the control signals generated by control units 12, 12', and each operates on electrical power generated and/or stored by power supply or supplies 13. More particularly, each of brake components 14, 16, 18, 20, 22, 24 includes a brake actuator 26 incorporating an electronic control unit 28 which electronic control unit 28 causes brake actuator 26 to operate in response to the control signals. Electronic control units 28 are supplied electrical power by power supply or supplies 12. Brake actuators 26 may comprise electromechanical brake actuators which are also supplied electrical power by power supply or supplies 13. Alternately, brake actuators 26 may be actuated by hydraulic power, pneumatic power, combinations of these, and/or by any other appropriate non-electrical power, in which case, it is not necessary to supply electrical power to brake actuators 26. As such electronically controllable and/or electrically actuatable brake components are known in the art, a detailed discussion of the operation thereof is not presented herein.

Braking system 10 includes at least two control networks for transmitting control signals from control units 12, 12' to each of brake components 14, 16, 18, 20, 22, 24, with some of brake components 14, 16, 18, 20, 22, 24 being electrically connected to control units 12, 12' via one control network and others of brake components 14, 16, 18, 20, 22, 24 being electrically connected to control units 12, 12' via another or other control network(s). Preferably, each one of each pair of brake components is connected to a different control network.

In braking system 10 shown in FIG. 3, two control networks 30, 32 are provided. First control network 30 electrically connects control unit 12 with first brake component 14, third brake component 18 and fifth brake component 22 (i.e., one of each pair of brake components). First control network 30 is adapted to transmit the control signals from control unit 12 to first brake component 14, third brake component 18 and fifth brake component 22. Second control network 32 electrically connects control unit 12' with second brake component 16, fourth brake component 20 and sixth brake component 24 (i.e., the other one of each pair of brake components not electrically connected to first control network 30). Second control network 32 is adapted to transmit the control signals from control unit 12' to second brake component 16, fourth brake component 20 and sixth brake component 24.

It is desirable that no brake component is directly electrically connected to both of first control network 30 and second control network 32. This is true so as to reduce the likelihood that an external catastrophic event, such as a tire explosion, in the vicinity of one of the brake components cuts the network cabling and/or causes a short-circuit in both control networks 30, 32, thereby causing the entire brake system 10 to fail. For example, an external catastrophic event occurring in the vicinity of first brake component 14 may cause damage to first control network 30, thereby causing first control network 30 to be shorted and fail. However, because second control network 32 is not directly electrically connected to first brake component 14, such an external catastrophic event likely would not cause damage to second control network 32, and second control network 32 would still function.

Brake system 10 also includes auxiliary control links between each of the pairs of brake components, which auxiliary control links electrically connect the pairs of brake components when a failure occurs in one of the control networks 30, 32. The auxiliary control links are adapted to transmit the control signals between each of the brake components forming each pair of brake components when such a failure occurs. In the embodiment shown in FIG. 3, three such auxiliary control links 34, 36, 38 are shown. First auxiliary control link 34 electrically connects first brake component 14 and second brake component 16, second auxiliary control link 36 electrically connects third brake component 18 and fourth brake component 20, and third auxiliary control link 38 electrically connects fifth brake component 22 and sixth brake component 24.

It should be recognized that for system 10 to properly function, control signals for all brake components 14, 16, 18, 20, 22, 24 should be transmitted over both control networks 30, 32, not just the control signals for the brake components directly connected to each individual control network 30, 32. For example, although first brake component 14 is not directly connected to second control network 32, the control signals for first brake component 14 should be transmitted over second control network 32, so that in the event of a failure of first control network 30 (to which first brake component 14 is attached), control signals may be transmitted to first brake component 14 through second control network 32 and second brake component 16 via first auxiliary control link 34.

Thus, as discussed in the above example, suppose that an external catastrophic event occurs in the vicinity of first brake component 14 which causes damage to first control network 30, thereby causing first control network 30 to be shorted and/or fail. Because second control network 32 is not directly electrically connected to first brake component 14, such an external catastrophic event likely would not cause damage to second control network 32, and second control network 32 would still function. Since first brake component 14 would no longer be receiving control signals through first control network 30, first auxiliary control link 34 would attempt to supply control signals to first brake component 14 from second brake component 16. Of course, due to the hypothetical external catastrophic event, first brake component 14 may be damaged or destroyed and not function properly, and/or first auxiliary control link 34 may be damaged. Thus, first brake component 14 may not be operational. However, third brake component 18 and fifth brake component 22 are likely not damaged—they are simply no longer receiving control signals through the failed first control network 30. As such, control signals supplied to third brake component 18 and fifth brake component 22 from fourth brake component 20 and sixth brake component 24 through second auxiliary control link 36 and third auxiliary control link 38 respectively could be used to control third brake component 18 and fifth brake component 22.

Thus, system redundancy is provided, while at the same time isolation of the control networks 30, 32 from one another is maintained by providing connection between brake components on different control networks 30, 32 by way of a buffer (i.e., auxiliary control links 34, 36, 38). Thus, it is extremely unlikely that both control networks 30, 32 will fail. At the same time, if one of them does fail, control of at least some of the brake components on the failed control network can still be maintained.

In addition to controlling standard braking operations, control units 12, 12' may control various additional braking functions, such as wheel slip control, e.g., antilock brake systems (ABS), and electronic braking force distribution (EBV) systems, as well as other vehicle systems, such as vehicle suspension and dynamic stability systems. In other alternatives the brake electronics (i.e., electronic control unit 28) of each of brake components 14, 16, 18, 20, 22, 24 can also handle the wheel anti lock function (e.g., ABS). A benefit of such architecture is that the brake can react quicker upon a detected wheel lock. If the wheel slip control (e.g., ABS) is handled by control units 12, 12' the time delay in the communication networks 30, 32 and the computing time in the control units 12, 12' are introduced as delays in the control chain (as is the case with most systems today). Instead of employing this approach, the wheel speed sensor may be connected directly to the brake electronics (i.e., electronic control unit 28). The vehicle reference speed may be calculated in the control units 12, 12' and sent back to the brake electronics (i.e., electronic control unit 28), since the vehicle speed is changing slower than the wheel speed. The wheel speed and the vehicle reference speed may then be used by brake electronics (i.e., electronic control unit 28) to control braking of each wheel, thereby providing a very rapid response. System 10 may also be employed to control non-conventional systems, such as regenerative braking for hybrid vehicles and integrated starter-generator systems (ISG).

Braking system 10 also includes at least two power supply networks for transmitting electrical power from power supply or supplies 13 to each of brake components 14, 16, 18, 20, 22, 24, with some of brake components 14, 16, 18, 20, 22, 24 being electrically connected to power supply or supplies 13 via one power supply network and others of brake components 14, 16, 18, 20, 22, 24 being electrically connected to power supply or supplies 13 via another or other power supply network(s). Preferably, each one of each pair of brake components is connected to a different power supply network.

In braking system 10 shown in FIG. 3, two power supply networks 40, 42 are provided. First power supply network 40 electrically connects power supply or supplies 13 with first brake component 14, third brake component 18 and fifth brake component 22 (i.e., one of each pair of brake components). First power supply network 40 is adapted to transmit electrical power from power supply or supplies 13 to first brake component 14, third brake component 18 and fifth brake component 22. Second power supply network 42 electrically connects power supply or supplies 13 with second brake component 16, fourth brake component 20 and sixth brake component 24 (i.e., the other one of each pair of brake components not electrically connected to first power supply network 40). Second power supply network 42 is adapted to transmit electrical power from power supply or supplies 13 to second brake component 16, fourth brake component 20 and sixth brake component 24.

It is desirable that no brake component is directly electrically connected to both of first power supply network 40 and second power supply network 42. This is true so as to reduce the likelihood that an external catastrophic event, such as a tire explosion, in the vicinity of one of the brake components cuts the network cabling and/or causes a short-circuit in both power supply networks 40, 42, thereby causing the entire brake system 10 to fail. For example, an external catastrophic event occurring in the vicinity of first brake component 14 may cause damage to first power supply network 40, thereby causing first power supply network 40 to be shorted and fail. However, because second power supply network 42 is not directly electrically connected to first brake component 14, such an external catastrophic event likely would not cause damage to second power supply network 42, and second power supply network 42 would still function.

Brake system 10 also includes auxiliary power supply links between each of the pairs of brake components, which auxiliary power supply links are activatable to electrically connect the pairs of brake components when a failure occurs in one of the power supply networks 40, 42, as described in more detail below. The auxiliary power supply links are adapted to transmit electrical power between each of the brake components forming each pair of brake components when such a failure occurs. In the embodiment shown in FIG. 3, three such auxiliary power supply links 44, 46, 48 are shown. First auxiliary power supply link 44 electrically connects first brake component 14 and second brake component 16, second auxiliary power supply link 46 electrically connects third brake component 18 and fourth brake component 20, and third auxiliary power supply link 48 electrically connects fifth brake component 22 and sixth brake component 24.

It should be recognized that for system 10 to properly function, enough electrical power for all brake components 14, 16, 18, 20, 22, 24 may be transmitted over both power supply networks 40, 42, not just an amount of electrical power sufficient to operate the brake components directly connected to each individual power supply network 40, 42. For example, although first brake component 14 is not directly connected to second power supply network 42, enough electrical power to operate first brake component 14 should be transmitted over second power supply network 42, so that in the event of a failure of first power supply network 40 (to which first brake component 14 is attached), electrical power may be transmitted to first brake component 14 through second power supply network 42 and second brake component 16 via first auxiliary power supply link 44. In an alternative design, a low power mode may be employed when the power supply capability is limited (i.e., when one power supply network is failing or shorted). Although such a mode may provide degraded dynamic performance, such would prevent complete system failure.

In an alternative embodiment where two independent power supplies 13 are provided, each power supply 13 may be capable of supplying half of the required power to the brake system 10 via power supply networks 40, 42. If one of the power supply networks 40, 42 is short-circuited in one brake unit, the power supplies 13 would be capable of supplying the combined power from both power supplies 13 through the still functioning power supply network 40, 42, thereby allowing the brake units to work with full dynamic capability. The two power networks 40, 42 may be mechanically separated from each other (e.g., by being disposed on different sides of the vehicle).

Thus, as discussed in the above example, suppose that an external catastrophic event occurs in the vicinity of first brake component 14 which causes damage to first power supply network 40, thereby causing first power supply network 40 to be shorted and/or fail. Because second power supply network 42 is not directly electrically connected to first brake component 44, such an external catastrophic event likely would not cause damage to second power supply network 42, and second power supply network 42 would still function. Since first brake component 14 would no longer be receiving electrical power through first power supply network 40, first auxiliary power supply link 44 would attempt to supply electrical power to first brake component 14 from second brake component 16. Of course, due to the hypothetical external catastrophic event, first brake component 14 may be damaged or destroyed and not function properly, and/or first auxiliary power supply link 44 may be damaged. Thus, first brake component 14 may not be operational. However, third brake component 18 and fifth brake component 22 are likely not damaged—they are simply no longer receiving electrical power through the failed first power supply network 40. As such, electrical power supplied to third brake component 18 and fifth brake component 22 from fourth brake component 20 and sixth brake component 24 through second auxiliary power supply link 46 and third auxiliary power supply link 48 respectively could be used to operate third brake component 18 and fifth brake component 22.

Thus, system redundancy is provided, while at the same time isolation of the power supply networks 40, 42 from one another is maintained by providing connection between brake components on different power supply networks 40, 42 by way of a buffer (i.e., auxiliary power supply links 44, 46, 48). Thus, it is extremely unlikely that both power supply networks 40, 42 will fail. At the same time, if one of them does fail, operation of at least some of the brake components on the failed power supply network can still be maintained.

In some cases, it may be desirable for two power supplies 13 to be provided. When such is the case, one of power supplies 13 may be electrically connected to first power supply network 40, while the other of power supplies 13 may be electrically connected to second power supply network 42. Alternatively, in order to maintain true redundancy (for example, if one of power supplies 13 fails), each of the two power supplies 13 may be electrically connected to both power supply networks 40, 42. In other cases, it may be desirable for a single power supply 13 to be provided, which power supply 13 may be electrically connected to both power supply networks 40, 42. Of course, in any case where power supply or supplies 13 is or are connected to both power supply networks 40, 42, it would be desirable to provide power supply or supplies 13 with safeguard measures to ensure that shorting or other failure of one power supply network 40, 42 does not short or otherwise cause a failure of the entire power supply or supplies 13.

In addition to providing electrical power to brake components 14, 16, 18, 20, 22, 24, power supply or supplies 13 may provide electrical power to various additional brake system components, such as antilock brake systems (ABS) and electronic braking force distribution (EBV) systems, as well as other vehicle systems, such as vehicle suspension and dynamic stability systems. System 10 may also be employed to power non-conventional systems, such as regenerative braking for hybrid vehicles and integrated starter-generator systems (ISG).

System 10 also includes at least one human-machine interface (HMI) 50 for allowing a driver to input various control commands. HMI 50 may comprise, for example, a pedal, a switch, a joystick, a lever, a button, a knob, any other input device actuatable or manipulatable by a driver, or any combination of the above. Each HMI 50 includes two sensors 52, 54, with each sensor 52, 54 being connected to one of electronic control units 12, 12'. The two electronic control units 12, 12' are connected via a communications link 56 for cross-checking purposes as described below.

The input signals produced by sensors 52, 54 of HMI 50 are used by electronic control units 12, 12' to control various functions of system 10. For example, in the case of controlling application of the service brakes of a vehicle, HMI 50 typically comprises a brake pedal. This brake pedal includes two sensors 52, 54 for detecting application thereof. Sensor 52 is connected to and provides input signals to electronic control unit 12, while sensor 54 is connected to and provides input signals to electronic control unit 12'. An exemplary method 58 for the cross-checking of input signals received from HMI 50 and the creation of control signals for controlling actuation of brake components 14, 16, 18, 20, 22, 24 is shown in FIG. 4.

Figure 4:
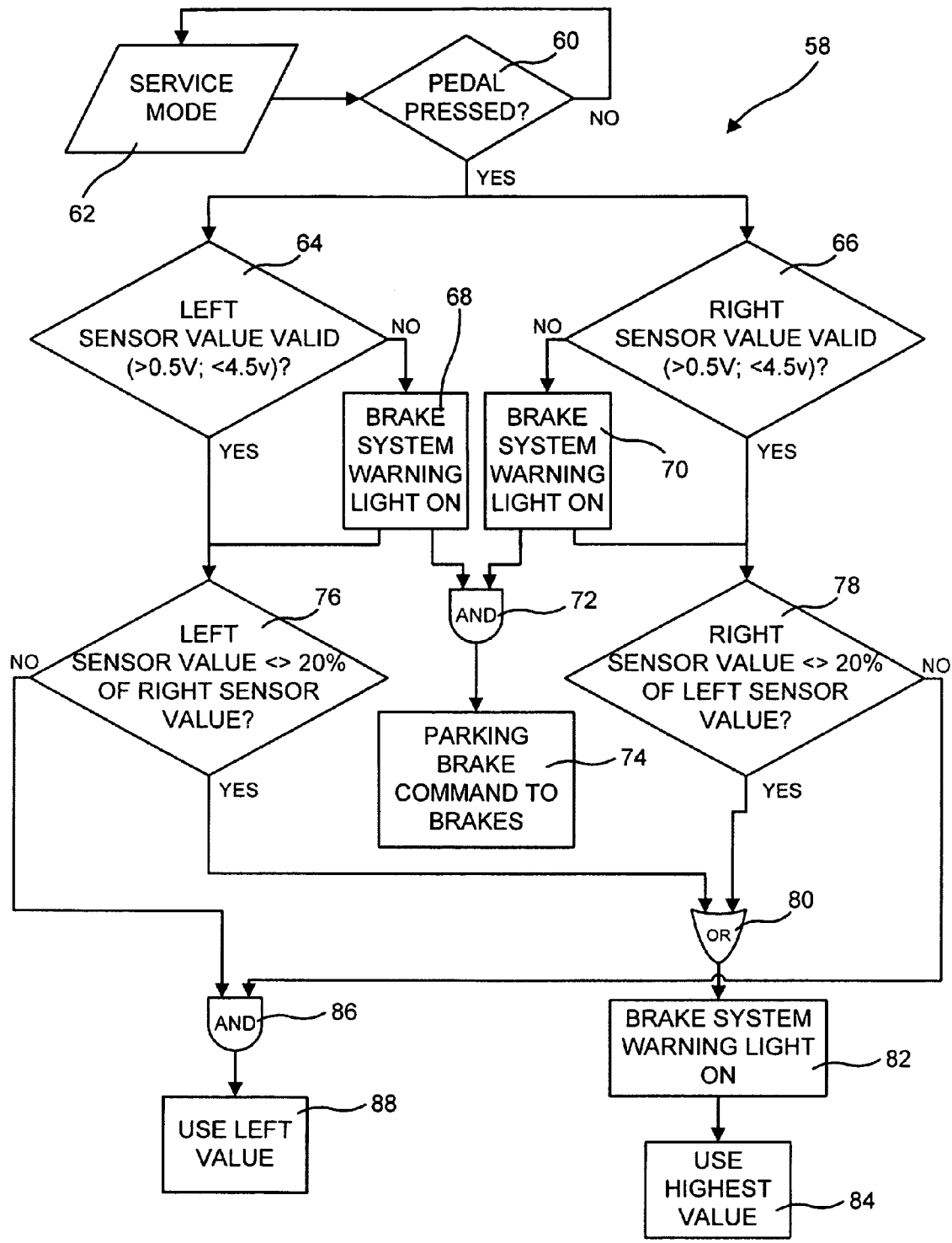

As shown in FIG. 4, at block 60 it is determined whether HMI 50, in this case a brake pedal, has been actuated (e.g., pressed). If the brake pedal has not been pressed, system 10 operates in service mode as indicated at block 62. If the brake pedal has been pressed, a determination is made at block 64 as to whether the sensor signal received by one of the electronic control units 12 from the left sensor (for example, sensor 52) is valid. For example, a valid signal may fall within a certain voltage range (e.g., between 0.5V and 4.5V). A determination is similarly made at block 66 as to whether the sensor signal received by the other one of the electronic control units 12' from the right sensor (for example, sensor 54) is valid.

If it is determined at blocks 64 or 66 that at least one of the sensor signals is not valid, a brake system warning light is switched on (at blocks 68, 70) to inform the vehicle operator of an error condition. If it is determined at blocks 64 or 66 that both of the sensor signals are not valid (indicated at block 72), thereby indicating a major malfunction in brake system 10, electronic control units 12, 12' generate and transmit to brake components 14, 16, 18, 20, 22, 24 a command signal to engage the parking brakes of the vehicle (indicated at block 74) in order to prevent an out-of-control vehicle situation.

If it is determined at blocks 64 or 66 that at least one of the sensor signals is valid, it is determined at block 76 whether the left sensor signal differs from the right sensor signal by more than an acceptable variance. For example, it may be determined whether the value of the left sensor signal is 20% less or 20% greater than the value of the right sensor signal. A similar determination is made at block 78 as to whether the right sensor signal differs from the left sensor signal by more than an acceptable variance.

If it is determined at blocks 76 and 78 that either the left sensor signal differs from the right sensor signal by more than an acceptable variance or that the right sensor signal differs from the left sensor signal by more than an acceptable variance (indicated at block 80), a brake system warning light is switched on at block 82 to inform the vehicle operator of an error condition, and the higher of the left sensor signal value and the right sensor signal value is used by the electronic control units 12, 12' to control the brake components 14, 16, 18, 20, 22, 24 (indicated at block 84). If it is determined at blocks 76 and 78 that neither the left sensor signal differs from the right sensor signal by more than an acceptable variance nor that the right sensor signal differs from the left sensor signal by more than an acceptable variance (indicated at block 86), the preferred sensor signal value (in this case the left sensor signal value) is used by the electronic control units 12, 12' to control the brake components 14, 16, 18, 20, 22, 24 (indicated at block 88).

Other techniques for the cross-checking of input signals received from HMI 50 and the creation of control signals for controlling actuation of brake components 14, 16, 18, 20, 22, 24 are also possible. For example, in the case where HMI 50 is a parking brake switch, lever, etc., including two sensors, each sensor is connected to one of electronic control units 12, 12'. If at least one of the sensors is "on" the system goes in to parking brake mode. If the data from the sensors are inconsistent, however, the electronic control units 12, 12' will indicate this to the driver/vehicle system. Of course it will be recognized by those skilled in the art that other possibilities exist for cross-checking input signals in order to verify their accuracy before acting upon them.

The present invention, therefore, provides an electrically controlled braking system which is intended for use with wheeled vehicles, which incorporates enhanced safety features, which employs system redundancy in case of partial system failure, which is relatively uncomplicated and less costly as compared to known systems, which is not prone to complete system failure in the case of an external catastrophic event, and which provides for the checking of errors between input devices and the control unit(s) which control actuation of the brakes.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An electrically controlled braking system comprising:
   a first control unit;
   a second control unit;
   wherein said first control unit and said second control unit are in electrical communication via a communication link;
   a human machine-interface manipulatable by a vehicle operator, said human-machine interface comprising a first sensor and a second sensor, the first sensor providing an input signal to said first control unit, and the second sensor providing an input signal to said second control unit;
   wherein said first control unit and said second control unit compare the input signal received from the first sensor with the input signal received from the second sensor, and generate control signals at least in part based upon the input signal received from the first sensor, the input signal received from the second sensor, and the comparison of the input signal received from the first sensor with the input signal received from the second sensor
   a first brake component responsive to the control signals generated by said first control unit and said second control unit;
   a second brake component responsive to the control signals generated by said first control unit and said second control unit;
   a first control network electrically connecting said first control unit and said first brake component, said first control network adapted to transmit the control signals from said first control unit to said first brake component;
   a second control network electrically connecting said second control unit and said second brake component, said second control network adapted to transmit the control signals from said second control unit to said second brake component; and
   an auxiliary control link electrically connecting said first brake component and said second brake component, said auxiliary control link adapted to transmit the control signals between said first brake component and said second brake component when a failure occurs in one of said first control network or said second control network.

2. The system of claim 1 wherein said first control unit and said second control unit further determine whether the input signal received from the first sensor and the input signal received from the second sensor are valid.

3. The system of claim 2 wherein the determination as to whether the input signal received from the first sensor and the input signal received from the second sensor are valid is based at least in part upon a determination as to whether the input signal received from the first sensor and the input signal received from the second sensor have values falling within an expected range.

4. The system of claim 2 further comprising an error condition indicator, and wherein the error condition indicator is activated if at least one of the input signal received from the first sensor and the input signal received from the second sensor is invalid.

5. The system of claim 4 wherein said first control unit and said second control unit generate control signals indicative of a demand for parking brake application if both of the input signal received from the first sensor and the input signal received from the second sensor are invalid.

6. The system of claim 1 wherein the comparison of the input signal received from the first sensor with the input signal received from the second sensor is based at least in part upon a determination of whether a value of the input signal received from the first sensor differs from a value of the input signal received from the second sensor by more than an acceptable variance.

7. The system of claim 6 wherein the comparison of the input signal received from the first sensor with the input signal received from the second sensor is further based at least in part upon a determination of whether a value of the input signal received from the second sensor differs from a value of the input signal received from the first sensor by more than an acceptable variance.

8. The system of claim 1 wherein said human machine-interface comprises at least one of a pedal, a switch, a joystick, a lever, a button and a knob.

9. The system of claim 1 further comprising:
   at least one power supply, said at least one power supply supplying electrical power;
   a first brake component responsive to the control signals generated by said first control unit and said second control unit and at least partially operated by electrical power;
   a second brake component responsive to the control signals generated by said first control unit and said second control unit and at least partially operated by electrical power;
   a first power supply network electrically connecting said at least one power supply and said first brake component, said first power supply network adapted to transmit the electrical power from said at least one power supply to said first brake component; and
   a second power supply network electrically connecting said at least one power supply and said second brake component, said second power supply network adapted to transmit the electrical power from said at least one power supply to said second brake component.

10. The system of claim 9 further comprising an auxiliary power supply link activatable to electrically connect said first brake component and said second brake component when a failure occurs in one of said first power supply network or said second power supply network, said auxiliary power supply link adapted to transmit the electrical power between said first brake component and said second brake component when the failure occurs.

11. An electrically controlled braking system comprising:
    at least one control unit, said at least one control unit generating control signals;
    at least one power supply, said at least one power supply supplying electrical power;
    a first brake component responsive to the control signals generated by said at least one control unit and at least partially operated by electrical power;
    a second brake component responsive to the control signals generated by said at least one control unit and at least partially operated by electrical power;

a first control network electrically connecting said at least one control unit and said first brake component, said first control network adapted to transmit the control signals from said at least one control unit to said first brake component;

a second control network electrically connecting said at least one control unit and said second brake component, said second control network adapted to transmit the control signals from said at least one control unit to said second brake component;

an auxiliary control link electrically connecting said first brake component and said second brake component, said auxiliary control link adapted to transmit the control signals between said first brake component and said second brake component when a failure occurs in one of said first control network or said second control network;

a first power supply network electrically connecting said at least one power supply and said first brake component, said first power supply network adapted to transmit the electrical power from said at least one power supply to said first brake component;

a second power supply network electrically connecting said at least one power supply and said second brake component, said second power supply network adapted to transmit the electrical power from said at least one power supply to said second brake component; and an auxiliary power supply link activatable to electrically connect said first brake component and said second brake component when a failure occurs in one of said first power supply network or said second power supply network, said auxiliary power supply link adapted to transmit the electrical power between said first brake component and said second brake component when the failure occurs.

12. The system of claim 11:
wherein said at least one control unit comprises a first control unit and a second control unit and further comprising:
wherein said first control unit and said second control unit are in electrical communication via a communication link;
further comprising a human machine-interface manipulatable by a vehicle operator, said human-machine interface comprising a first sensor and a second sensor, the first sensor providing an input signal to said first control unit, and the second sensor providing an input signal to said second control unit; and
wherein said first control unit and said second control unit compare the input signal received from the first sensor with the input signal received from the second sensor, and generate control signals at least in part based upon the input signal received from the first sensor, the input signal received from the second sensor, and the comparison of the input signal received from the first sensor with the input signal received from the second sensor.

13. The system of claim 12 wherein said first control unit and said second control unit further determine whether the input signal received from the first sensor and the input signal received from the second sensor are valid.

14. The system of claim 13 wherein the determination as to whether the input signal received from the first sensor and the input signal received from the second sensor are valid is based at least in part upon a determination as to whether the input signal received from the first sensor and the input signal received from the second sensor have values falling within an expected range.

15. The system of claim 13 further comprising an error condition indicator, and wherein the error condition indicator is activated if at least one of the input signal received from the first sensor and the input signal received from the second sensor is invalid.

16. The system of claim 15 wherein said first control unit and said second control unit generate control signals indicative of a demand for parking brake application if both of the input signal received from the first sensor and the input signal received from the second sensor are invalid.

17. The system of claim 12 wherein the comparison of the input signal received from the first sensor with the input signal received from the second sensor is based at least in part upon a determination of whether a value of the input signal received from the first sensor differs from a value of the input signal received from the second sensor by more than an acceptable variance.

18. The system of claim 17 wherein the comparison of the input signal received from the first sensor with the input signal received from the second sensor is further based at least in part upon a determination of whether a value of the input signal received from the second sensor differs from a value of the input signal received from the first sensor by more than an acceptable variance.

19. The system of claim 12 wherein said human machine-interface comprises at least one of a pedal, a switch, a joystick, a lever, a button and a knob.

20. A method of controlling a braking system comprising the steps of:
providing a first control unit and a second control unit in electrical communication with one another via a communication link;
manipulating a human machine-interface having a first sensor and a second sensor;
providing an input signal from the first sensor to the first control unit;
providing an input signal from the second sensor to the second control unit;
comparing the input signal received from the first sensor with the input signal received from the second sensor;
generating control signals at least in part based upon the input signal received from the first sensor, the input signal received from the second sensor, and the comparison of the input signal received from the first sensor with the input signal received from the second sensor
providing a first brake component responsive to the control signals generated by the first control unit and the second control unit;
providing a second brake component responsive to the control signals generated by the first control unit and the second control unit;
electrically connecting the first control unit and the first brake component via a first control network, the first control network adapted to transmit the control signals from the first control unit to the first brake component;
electrically connecting the second control unit and the second brake component via a second control network, the second control network adapted to transmit the control signals from the second control unit to the second brake component; and
electrically connecting the first brake component and the second brake component via an auxiliary control link, the auxiliary control link adapted to transmit the control signals between the first brake component and the second brake component when a failure occurs in one of the first control network or the second control network.

21. The method of claim 20 further comprising the step of determining whether the input signal received from the first sensor and the input signal received from the second sensor are valid.

22. The method of claim 21 wherein said step of determining whether the input signal received from the first sensor and the input signal received from the second sensor are valid is based at least in part upon a determination as to whether the input signal received from the first sensor and the input signal received from the second sensor have values falling within an expected range.

23. The method of claim 21 further comprising the step of activating an error condition indicator if at least one of the input signal received from the first sensor and the input signal received from the second sensor is invalid.

24. The method of claim 23 further comprising the step of generating control signals indicative of a demand for parking brake application if both of the input signal received from the first sensor and the input signal received from the second sensor are invalid.

25. The method of claim 20 wherein said step of comparing the input signal received from the first sensor with the input signal received from the second sensor is based at least in part upon a determination of whether a value of the input signal received from the first sensor differs from a value of the input signal received from the second sensor by more than an acceptable variance.

26. The method of claim 25 wherein said step of comparing the input signal received from the first sensor with the input signal received from the second sensor is further based at least in part upon a determination of whether a value of the input signal received from the second sensor differs from a value of the input signal received from the first sensor by more than an acceptable variance.

27. The method of claim 20 wherein the human machine-interface comprises at least one of a pedal, a switch, a joystick, a lever, a button and a knob.

28. The method of claim 20 further comprising the steps of:
   supplying electrical power with at least one power supply;
   providing a first brake component responsive to the control signals generated by the first control unit and the second control unit and at least partially operated by electrical power;
   providing a second brake component responsive to the control signals generated by the first control unit and the second control unit and at least partially operated by electrical power;
   electrically connecting the at least one power supply and the first brake component via a first power supply network, the first power supply network adapted to transmit the electrical power from the at least one power supply to the first brake component; and
   electrically connecting the at least one power supply and the second brake component via a second power supply network, the second power supply network adapted to transmit the electrical power from the at least one power supply to the second brake component.

29. The method of claim 28 further comprising the step of activating an auxiliary power supply link to electrically connect the first brake component and the second brake component when a failure occurs in one of the first power supply network or the second power supply network, the auxiliary power supply link adapted to transmit the electrical power between the first brake component and the second brake component when the failure occurs.

* * * * *